(12) United States Patent
Kodeda et al.

(10) Patent No.: US 6,804,284 B1
(45) Date of Patent: Oct. 12, 2004

(54) OPTICAL ELEMENT HOLDING AND EXTRACTION DEVICE

(75) Inventors: Hans Kodeda, Landshut (DE); Helmut Frowein, Munich (DE)

(73) Assignee: TuiLaser AG, Germering (DE)

( * ) Notice: Subject to any disclaimer, the term of this patent is extended or adjusted under 35 U.S.C. 154(b) by 0 days.

(21) Appl. No.: 09/510,666

(22) Filed: Feb. 22, 2000

(51) Int. Cl.$^7$ .............................................. H01S 3/22
(52) U.S. Cl. ...................... 372/55; 372/57; 372/61; 372/62; 372/65; 372/107; 372/63; 372/64; 372/99; 372/101; 372/108
(58) Field of Search ............................ 372/55, 57, 61, 372/62, 65, 107, 63, 64, 99, 101, 108

(56) References Cited

U.S. PATENT DOCUMENTS

| | | |
|---|---|---|
| 3,400,596 A | 9/1968 | Laich ..................... 74/89.23 |
| 3,753,144 A | 8/1973 | Kearns et al. ............... 372/35 |
| 3,877,794 A | 4/1975 | Kulle et al. ................ 350/187 |
| 3,886,474 A | 5/1975 | Hensolt et al. ............ 372/107 |
| 4,423,510 A | 12/1983 | Pack et al. ................... 372/56 |
| 4,448,385 A | 5/1984 | Matthys ..................... 248/476 |
| 4,534,034 A | 8/1985 | Hohla et al. ................. 372/59 |
| 4,541,848 A | 9/1985 | Masuda et al. ............. 361/235 |
| 4,638,486 A | 1/1987 | Dost et al. ................. 372/107 |
| 4,686,685 A | 8/1987 | Hoag ......................... 372/107 |
| 4,744,091 A | 5/1988 | Gorisch et al. ............ 372/107 |
| 4,746,201 A | 5/1988 | Gould ......................... 350/394 |
| 4,769,824 A | 9/1988 | Seki ........................... 372/107 |
| 4,891,818 A | 1/1990 | Levatter ....................... 372/57 |
| 5,268,923 A | 12/1993 | Welsch et al. .............. 372/107 |
| 5,319,663 A | 6/1994 | Reid et al. ................... 372/59 |
| 5,373,523 A | 12/1994 | Fujimoto et al. ........... 372/103 |
| 5,438,587 A | 8/1995 | Kinley .......................... 372/86 |
| 5,443,289 A * | 8/1995 | Guest ........................... 285/39 |
| 5,473,162 A | 12/1995 | Busch et al. .......... 250/339.08 |
| 5,585,641 A | 12/1996 | Sze et al. ................ 250/492.1 |
| 5,591,317 A | 1/1997 | Pitts, Jr. ..................... 204/667 |
| 5,729,564 A | 3/1998 | Cullumber ................... 372/58 |

(List continued on next page.)

FOREIGN PATENT DOCUMENTS

| | | |
|---|---|---|
| DE | 31 30 399 A1 | 2/1983 |
| DE | 32 12928 C2 | 10/1983 |
| DE | 37 10 525 C2 | 10/1987 |
| DE | 297 15 466 u1 | 10/1997 |
| DE | 198 40 035 A1 | 4/1999 |
| EP | 0456875 A | 11/1991 |
| EP | 1130698 A1 * | 2/2001 |
| FR | 2698496 A | 5/1994 |
| JP | 2250383 | 10/1990 |
| JP | 05067823 | 3/1993 |
| JP | 5152643 A | 6/1993 |
| JP | 06237034 | 8/1994 |
| WO | WO9960674 A | 11/1999 |

OTHER PUBLICATIONS

Kodeda, et al., "Adjustable Mounting Unit for an Optical Element of a Gas Laser," US application 09/511,648 filed Feb. 22, 2000 (Status: pending).

(List continued on next page.)

*Primary Examiner*—Paul Ip
*Assistant Examiner*—Delma R. Flores-Ruiz
(74) *Attorney, Agent, or Firm*—Mintz, Levin, Cohn, Ferris, Glovsky and Popeo, P.C.

(57) ABSTRACT

An optical element holding and extraction device is provided. The device includes an optical element, an optical element holder having a tubular gripping portion and a tubular extraction portion connected at one end to the tubular gripping portion, and a retainer that is slideably carried on the tubular extraction portion. The diameter of the tubular extraction portion is less than the tubular gripping portion. In addition, the tubular gripping portion grips the peripheral edge of the optical clement. The device may be used in a variety of gas lasers, including excimer lasers.

19 Claims, 3 Drawing Sheets

U.S. PATENT DOCUMENTS

| | | | | |
|---|---|---|---|---|
| 5,748,663 A | * | 5/1998 | Chenausky | 372/55 |
| 5,771,258 A | | 6/1998 | Morton et al. | 372/57 |
| 5,857,775 A | * | 1/1999 | Vodzak et al. | 374/121 |
| 6,018,537 A | | 1/2000 | Hofmann et al. | 372/102 |
| 6,151,346 A | | 11/2000 | Partlo et al. | 372/38.02 |
| 6,192,061 B1 | * | 2/2001 | Hart et al. | 372/107 |
| 6,208,674 B1 | | 3/2001 | Webb et al. | 372/55 |
| 6,333,775 B1 | * | 12/2001 | Haney et al. | 355/30 |
| 6,359,922 B1 | | 3/2002 | Partlo et al. | 372/57 |
| 6,363,094 B1 | | 3/2002 | Morton et al. | 372/58 |
| 6,493,375 B1 | * | 12/2002 | Kodeda et al. | 372/107 |
| 6,567,450 B2 | * | 5/2003 | Myers et al. | 372/55 |

OTHER PUBLICATIONS

Strowtizki, et al. "Gas Laser Discharge Unit," US application 09/510,539 filed Feb. 22, 2000 (Status: pending).

Kodeda, et al., "A Gas Laser and a Dedusting Unit Thereof," US application 09/511,649 filed Feb. 22, 2000 (Status: pending).

Strowitzki, "Dedusting Unit for a Laser Optical Element of a Gas Laser and Method For Assembling," US application 09/510,667 filed Feb. 22, 2000 (Status: pending).

Strowitzki, et al., "Shadow Device for a Gas Laser," US application 09/510,017 filed Feb. 22, 2000 (Status: pending).

Strowitzki, et al., "Modular Gas Laser Discharge Unit," US application 09/510,538 filed Feb. 22, 2000 (Status: pending).

* cited by examiner

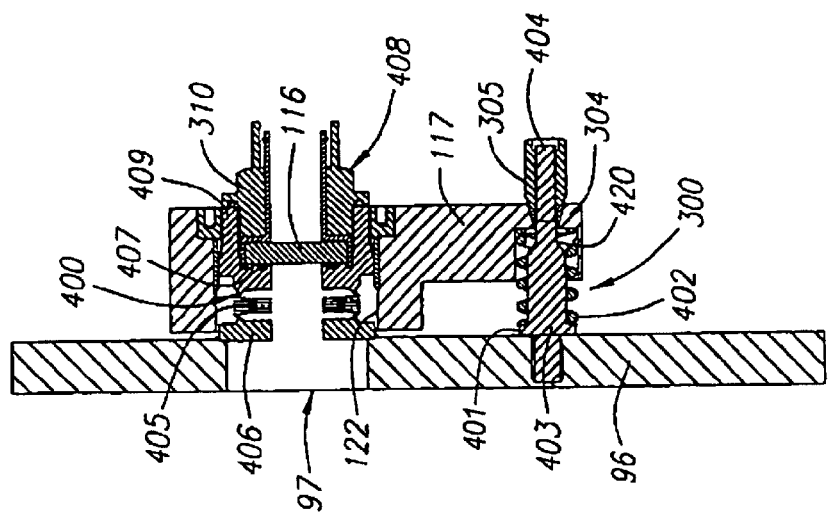
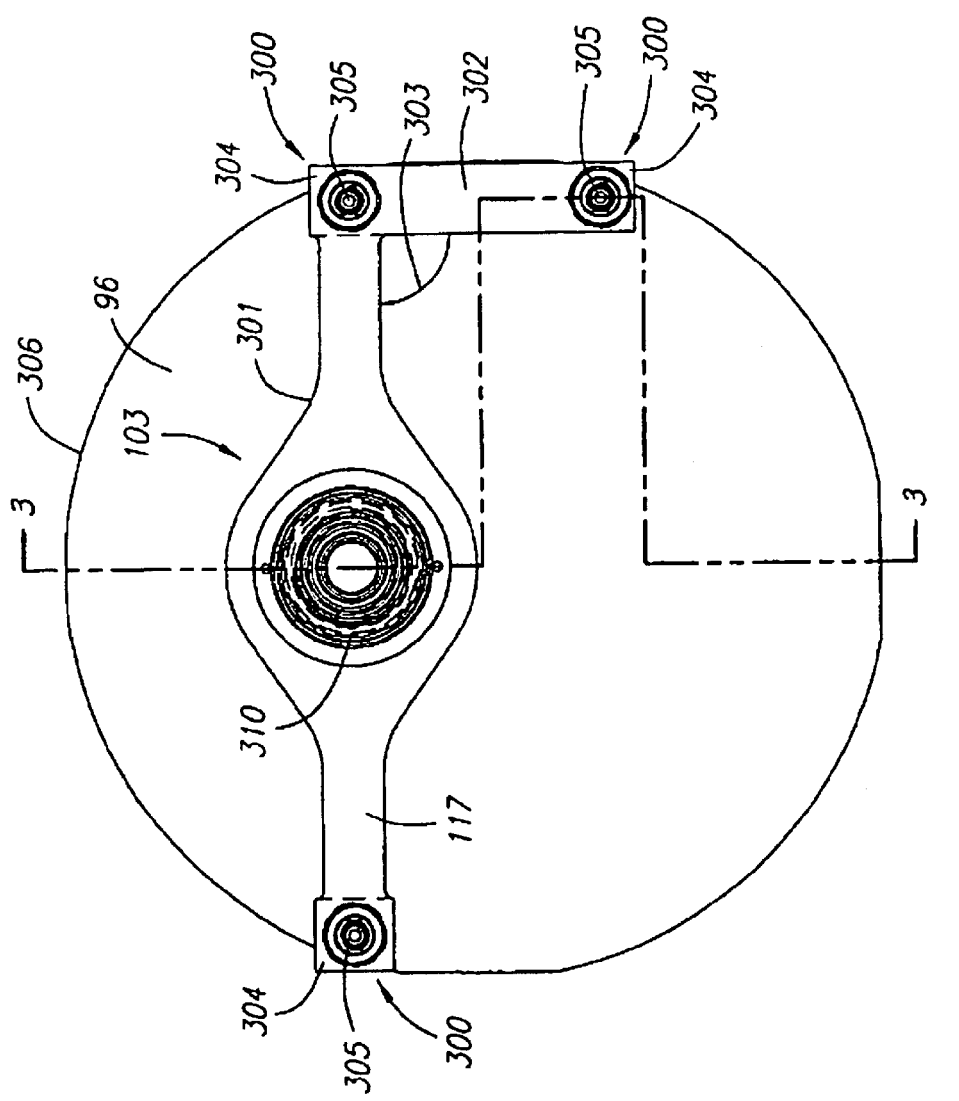

OPTICAL ELEMENT HOLDING AND EXTRACTION DEVICE

FIELD OF THE INVENTION

The invention relates to gas lasers. More particularly the invention relates to holding and extraction devices for the optical elements of gas lasers.

BACKGROUND OF THE INVENTION

Lasers have recently been applied to a large variety of technical areas, such as optical measurement techniques, material processing, medicine, etc.

Due to the special chemical, ablative, spectroscopic or diffractive properties of UV light, there is a big demand for lasers that generate laser beams having a short wavelength in the UV range.

Excimer lasers, such as the ones disclosed in U.S. Pat. Nos. 5,771,258 and 5,438,587, serve well as a laser for generating coherent, high intensity pulsed beams of light in the UV wavelength range.

The excimer lasers described in U.S. Pat. Nos. 5,771,258 and 5,438,587, are pulsed lasers. Pulsing is required in excimer lasers to allow sufficient time between pulses to replace the laser gas within the discharge region with fresh gas and allow the gas used for generating the previous pulse to recover before being used again for another gas discharge. In the discharge region (i.e., discharge gap), which in an excimer laser is typically defined between an elongated high voltage electrode and an elongated ground electrode which are spaced apart from each other, a pulsed high voltage occurs, thereby initializing emissions of photons which form the laser beam.

The laser beam is emitted along the extended ground electrode in a longitudinal direction of the laser tube. To achieve the desired amplification by stimulated emission of radiation, a resonator comprising a reflecting and a partially reflecting optical element disposed at opposite ends of the discharge gap is required. The laser beam leaves the tube through the latter.

If the reflective optical elements are provided outside the gas laser tube, a fully transparent window is provided in alignment with the discharge gap at each end of the tube to seal the tube, as can be seen in U.S. Pat. No. 5,438,587, for example. A mirror or other reflective optical element is then provided in axial alignment with one of the windows and its reflective side facing the window. A partially transparent, partially reflective mirror is positioned outside the tube so that it is aligned with and facing the other window. As a result, the faces of the two reflective optical elements are opposing one another and define a laser light resonator.

If the reflective optical elements are used to seal the tube, the mirror and the partially transparent, partially reflective mirror are integrated into the end walls of the tube at opposite ends of the discharge gap. As a result, no extra windows are required. For lasers emitting light in the ultraviolet range of the electromagnetic spectrum, extra windows have the disadvantage of significantly reducing the efficiency and increasing the operating costs, as the special window materials employed are expensive and deteriorate with use and time and need to be occasionally changed. In addition, the transparent windows closing the tube form extra optical elements resulting in extra losses and reflections on the surfaces. The latter can be removed by inclining the window at Brewster's angle as taught by U.S. Pat. No. 4,746,201, but invariably the laser output is reduced. Deterioration of the optical elements also cannot be entirely avoided, reducing output and giving rise to the need to replace the rather expensive optical elements after a certain time.

Within the laser's resonator, the laser light resonates between the fully reflective mirror and the partially transmissive, partially reflective mirror to amplify the laser effect. In addition, a portion of the resonating light is emitted through the partially transmissive, partially reflective mirror at the target.

The reflective optical elements that form the resonator must be precisely positioned relative to one another to ensure optimal laser light output power, laser efficiency, and the quality of the laser beam. This is especially true with respect to the angular alignment of the reflective optical elements, not only with respect to each other, but also with respect to the laser tube. However, maintaining the appropriate angular alignment of the reflective optical elements is difficult in view of changes in the operating conditions, such as pressure or temperature of the gas and the temperature of the tube, the optical elements, and their supporting units. In addition, mechanical vibrations or shock to the laser may also affect the angular alignment of the reflective optical elements forming the laser resonator.

As is known in the art, the reflective optical elements forming the resonator may be provided inside or outside the laser tube. Regardless of whether the reflective optical elements are positioned inside or outside the laser tube, however, an optical element of some sort must be mounted to the laser tube to seal the laser tube while allowing laser light to be transmitted out of the laser tube. Thus, when the reflective optical elements are used to seal the tube, they are integrated into the end walls of the tube at opposite ends of the discharge gap and thus are used to seal the tube. On the other hand, if the reflective optical elements forming the resonator are provided outside the laser tube, then fully transparent windows are provided at opposite ends of the tube to seal the tube. It is known that these optical elements, both reflective and transmissive, may be secured to the laser tube by means of a flange fixed by screws. This known securing mechanism, however, has many disadvantages. These disadvantages include:

1. The central portion of the optical element is blackened on its internal side, i.e. on the laser side of the window. This results in the central portion of the optical element quickly deteriorating.
2. When the optical element is detached from the laser, for cleaning for example, the optical element frequently falls out of the securing device in which the optical element is inserted during normal operation and is thereby permanently damaged.
3. Further, because the optical element is typically fixed with screws to the end of the laser tube, it has not been possible or practical to turn the window in the securing mechanism. However, a securing mechanism that would allow the optical element to be rotated about its central axis would be desirable, for instance to allow the laser beam to pass through a portion of the optical element that is not blackened.
4. In smaller gas lasers it has been especially difficult to extract the optical element from the end of the laser tube, as there is very little space for obtaining access to the edge of the optical element without damaging it. This problem is further exacerbated by the fact that the optical element frequently adheres to an O-ring provided on the end wall of the laser tube, and which provides a gas-tight seal between the end wall of the tube and the optical element.

RELATED APPLICATIONS

The present invention may be used in conjunction with the inventions described in the patent applications identified below and which are being filed simultaneously with the present application:

| Docket No. | Title | Inventors | Filing Date | Serial or Patent No. |
|---|---|---|---|---|
| 249/300 | Gas Laser Discharge Unit | Claus Strowitzki and Hans Kodeda | Feb. 22, 2000 | 09/510,539 |
| 249/301 | Gas Laser and a Dedusting Unit Thereof | Hans Kodeda, Helmut Frowein, Claus Strowitzki, and Alexander Hohla | Feb. 22, 2000 | 09/511,649 |
| 249/302 | Dedusting Unit for a Laser Optical Element of a Gas Laser and Method for Assembling | Claus Strowitzki | Feb. 22, 2000 | 09/510,667 |
| 249/303 | Shadow Device for A Gas Laser | Claus Strowitzki and Hans Kodeda | Feb. 22, 2000 | 09/510,017 |
| 249/304 | Modular Gas Laser Discharge Unit | Claus Strowitzki and Hans Kodeda | Feb. 22, 2000 | 09/510,538 |
| 250/001 | Adjustable Mounting Unit for an Optical Element of a Gas Laser | Hans Kodeda, Helmut Frowein, Claus Strowitzki, and Alexander Hohla | Feb. 22, 2000 | 09/511,648 |

All of the foregoing applications are incorporated by reference as if fully set forth herein.

SUMMARY OF THE INVENTION

An object according to a first aspect of the invention is to provide an optical element holding and extraction device for a gas laser that permits improved maintenance characteristics of the optical element and thus is useful for extending the life of the optical element.

In order to achieve the first object, an optical element holding and extraction device is provided. The device includes an optical element, an optical element holder having a tubular gripping portion and a tubular extraction portion connected at one end to the tubular gripping portion, and a retainer that is slideably carried on the tubular extraction portion. The diameter of the tubular extraction portion is less than the tubular gripping portion. In addition, the tubular gripping portion grips or holds the peripheral edge of the optical element. The device according to the present object of the invention preferably further comprises a mounting structure comprising an optical element receiving surface. The retainer is removeably engaged with the mounting structure and secures the optical element against the optical element receiving surface.

Because the optical element is held in the gripping portion of the optical element holder and the optical element holder and optical element are removeably secured by the retainer to the mounting structure, the maintainability of the window is improved. Indeed, with the device according to the present invention it is now possible to readily and safely detach the holder and optical element from the mounting structure. Therefore, the optical element does not need to be pried from the mounting structure, which is especially difficult in smaller gas lasers, as described above. Instead, the optical element may be detached from the holding and extracting device after the holder and optical element are removed, together with the retainer, from the mounting structure. Furthermore, the optical element can be removed from the holder in a location where there is more working space a available. Thus, the replacement and maintenance of the optical element becomes much more comfortable. Furthermore, the optical element does not tend to fall out of the mounting structure anymore, because it is received and held by the optical element holding and extraction device.

Pursuant to a second object of the invention, it is an object to provide a gas laser having an optical element, wherein the maintainability of the optical element is improved.

To achieve the second object according to the invention a gas laser is provided that comprises a tube having a first end wall at one end and a second end wall at the other end. The tube defines a cavity for containing a laser gas therein, and the first end wall includes a port. An optical axis extends longitudinally through the tube and passes through the port. The laser further comprises a mounting structure mounted on the exterior wall of the first end wall of the tube. The mounting structure includes an optical element receiving surface and an aperture extending through the receiving surface. The aperture is disposed transverse to the optical axis and is aligned with the port and the optical axis so that the optical axis passes through the aperture. An optical element and an optical element holder are also provided. The holder comprises a tubular gripping portion and a tubular extraction portion connected at one end to the tubular gripping portion and has a diameter less than that of the tubular gripping portion. The tubular gripping portion grips or holds the peripheral edge of the optical element so that the optical element is secured in the optical element holder. A retainer is slideably and rotateably carried on the tubular extraction portion of the holder. The retainer is also removeably engaged with the mounting structure and secures the optical element against the optical element receiving surface to form a gas tight seal therebetween. The optical element is disposed transverse to the optical axis and the optical axis impinges on the optical element.

The gas laser according to the second aspect of the invention has the same advantages as the optical element holding and extraction device according to the first aspect of the invention. Furthermore, by employing the optical element holding and extraction device according to the present invention in a laser, damage to the laser itself may be prevented. As a result, it is now much easier to detach optical elements from lasers, thereby minimizing the potential of mechanically damaging the optical element or the laser when trying to detach the optical element from the laser tube.

The further features or embodiments described below are also suitable for the stand-alone optical element holding and extraction device according to the present invention or gas lasers employing the device.

For example, the optical holding and extraction device is preferably designed so that the retainer may be loosened without completely disengaging it from the mounting structure, and once the retainer is loosened the holder is rotateable within the retainer about a common axis. In addition, preferably when the holder is rotated the optical element is rotated as well.

With this embodiment, it is now possible to rotate the optical element while the optical element is still secured in the mounting structure without ventilating the laser system.

This is especially advantageous when the laser light eccentrically impinges on the optical element because the lifetime of the optical element can be extended significantly. The lifetime of the optical element may be extended with this embodiment because it is now possible to occasionally rotate the optical element when the point where the laser beam impinges becomes too blackened. In other words, the optical element may be rotated so that the laser beam impinges on a fresh or clean portion of the optical element, thereby restoring the laser's efficiency. Furthermore, the rotation can be carried out a number of times until the optical element has been rotated by about 360°, thus multiplying the window's lifetime.

Other objects, features and advantages of the invention will become apparent to those skilled in the art from the following description of the preferred embodiment taken together with the drawings.

SHORT DESCRIPTION OF THE DRAWINGS

FIG. 2 is an end view of the laser shown in FIG. 1 and particularly illustrates an adjustable mounting unit for the optical element of the laser that includes an optical element holding and extraction device according to the preferred embodiment of the present invention; and FIG. 3 is a cross-sectional view taken along Line 3–3 of the adjustable mounting unit and end wall shown in FIG. 2.

DETAILED DESCRIPTION OF A PREFERRED EMBODIMENT OF THE INVENTION

Figure 1:
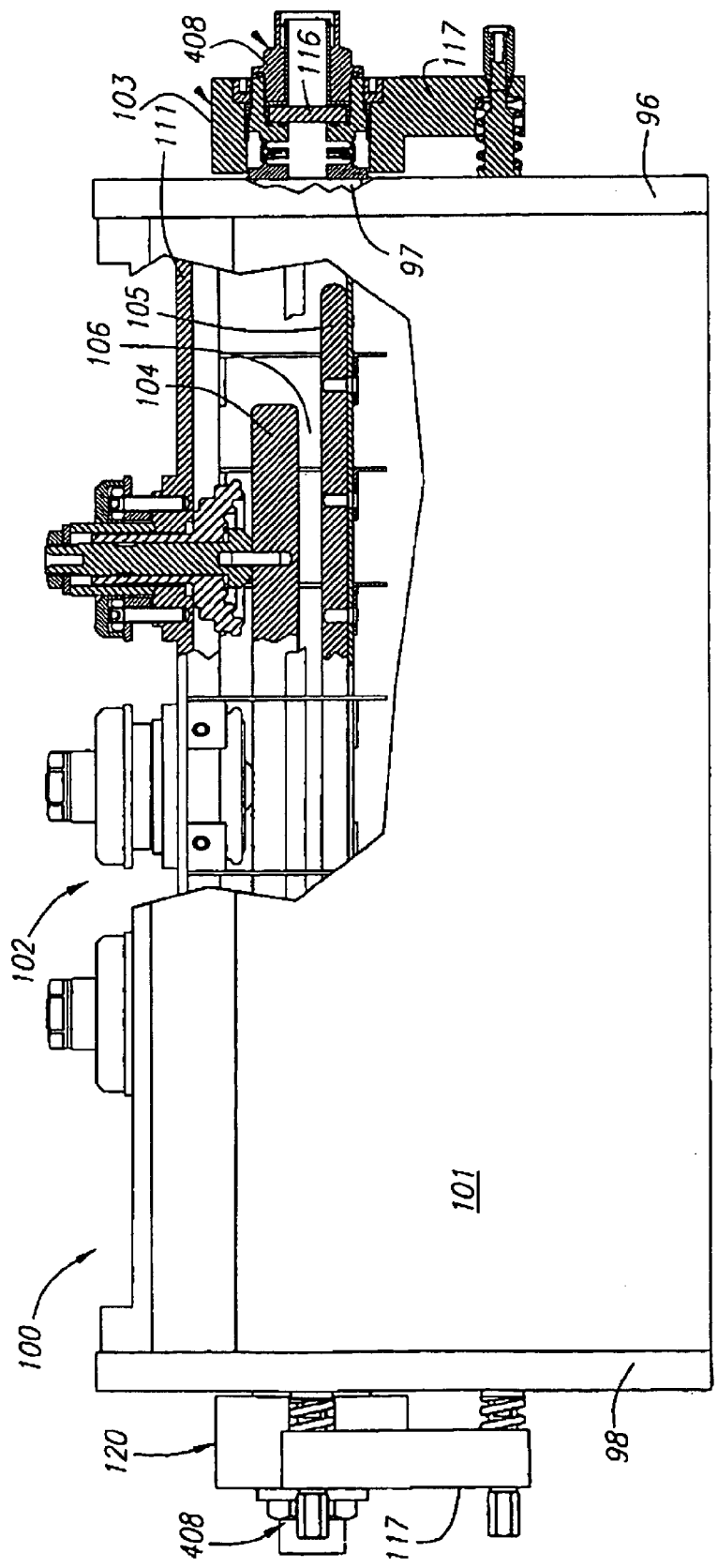
FIG. 1 is a partial cut-away view a gas laser in which an optical holding and extraction device according to a preferred embodiment of the present invention is employed.

A gas laser 100 employing an optical holding and extraction device 408 according to a preferred embodiment of the present invention is illustrated in FIG. 1.

Gas laser 100 preferably comprises a tube 101 a high voltage electrode 104, a ground electrode 105, and adjustable mounting units 103, 120 for the laser's optical elements. Adjustable mounting units 103, 120 include an optical holding and extraction device 408 for holding the optical element 116 in position and for safely and easily extracting the optical element for maintenance and repair.

Laser tube 101 includes a first end wall 96 at one end and a second end wall 98 at the other end. In addition, laser tube 101 defines a laser cavity for containing the desired laser gas.

The high voltage electrode 104 and the ground electrode 105 are spaced apart from each other, thereby defining a gas discharge gap 106.

Gas laser 100 is preferably an excimer laser such as a pulsed fluorine gas ($F_2$) fit excimer laser with a wavelength of about 157 nanometers. This means that a laser gas comprising fluorine gas is used for generating the laser beam. As those skilled in the art will appreciate, however, any of the known excimer laser gases may be used in connection with the present invention. Those skilled in the art will also appreciate that the present invention may be used in connection with any of the other gas lasers as well.

By applying a high voltage pulse on the order of 20 kV to the high voltage electrode 104, the laser gas (e.g., fluorine gas) and additionally helium, neon and/or argon gas as a buffer gas in the discharge gap 106 generate a laser beam which is emitted through the laser optical system comprising a front adjustable mounting unit 103 and a rear adjustable mounting unit 120. As those skilled in the art will appreciate, the laser resonating path, which is also referred to as the optical axis, for the laser 100 is in axial alignment with the gas discharge gap 106.

Particularly useful gas lasers 100 that may be employed in the present invention are described in concurrently filed applications bearing Ser. Nos. 09/511,649 and 09/510,538, which are hereby incorporated by reference as if fully set forth herein. The filing details of these applications are provided above.

Although high voltage electrode 104 and ground electrode 105 are preferably mounted on an electrode plate 111 to form a modular discharge unit 102 as described in the concurrently filed application bearing Ser. No. 09/511,649, the present invention is not limited to use in gas lasers with modular discharge units. Indeed, a wide variety of techniques have been used to mount an elongated high voltage electrode and an elongated ground electrode in a parallel, spaced-apart relationship in a gas laser tube so as to define a gas discharge gap therebetween and hence the laser resonating path and optical axis of the laser. Those skilled in the art will appreciate that these other techniques may also be satisfactorily employed in connection with the present invention. Therefore, while the gas lasers according to the present invention all include an optical axis or resonating path that longitudinally extends through the laser tube, how the discharge gap or optical axis is formed is not of particular importance.

Front and rear adjustable mounting units 103, 120 each include an optical element 116. Preferably optical elements 116 are reflective optical elements. However, as those skilled in the art will appreciate, optical elements 116 may also comprise fully transparent windows. If optical elements 116 comprise transparent windows, then the reflective optical elements forming the laser resonator would be mounted on a separate mounting structure as is known in the art. Optical elements 116 in the front and rear adjustable mounting units arc disposed in the laser resonating path and have one side exposed to the laser cavity formed by tube 101.

If the optical elements 116 are reflective, then optical element 116 in the front adjustable mounting unit 103 preferably comprises a partially reflective, partially transmissive mirror so that it will emit the laser beam from the front end of the laser. On the other hand, the optical element 116 of the rear adjustable mounting unit 120 preferably comprises a totally reflective mirror rather than a partially reflective mirror.

A port 97 is provided in each of the end walls 96, 98. Each of the ports is aligned with the resonating path or optical axis of the laser. In addition, the optical elements 116 are aligned with their respective port 97 so that laser light resonating in the laser can impinge upon the optical elements 116.

Preferably adjustable mounting unit 120 is similar in structure to the adjustable mounting unit 103 employed at end wall 96. However, laser 100 may also be designed so that the rear optical element 116 is mounted in alignment with the resonating path fully within laser tube 101. For example, rear optical element 116 could be mounted on the inner wall of the rear end wall 98, or, alternatively, on the exterior wall of the rear end wall so that it is covering port 97 formed therein. If optical element 116 is provided on the exterior wall of rear end wall 98, a flange structure may be used to mount the optical element as is known in the art.

Adjustable mounting unit 103 and optical holding and extraction device 408 are now described in connection with FIGS. 2, 3 and 4.

The adjustable mounting unit 103 comprises a rigid support 117 having an aperture defined by aperture wall 122. Optical element 116 is mounted within the aperture. First, second, and third adjustable mounting devices 300 are provided to attach the support structure to the laser at three separate points. Preferably the mounting points are selected so that they are displaced in an axial direction by substantially the same amount due to dimensional changes in the laser that occur during operation of the laser as a result of changes in temperature and pressure. Thus, to minimize deviations in the angular alignment of the optical element during the operation of the laser, preferably the mounting points are located proximate to the peripheral edge 306 of the tube as shown in FIG. 3. By selecting mounting points that are as close to the edge 306 of tube 101 as possible, any bending, curving and/or deflecting of the end wall 96, due to changes in temperature or pressure in the tube 101, will not affect the alignment of the reflective optical elements mounted on the adjustable mounting unit.

When the adjustable mounting unit 103 is attached to the laser tube, the rigid support 117 is spaced apart from the end wall 96 of the laser to allow for the adjustment of the angular positioning of the optical element 116. Furthermore, the aperture and optical element are disposed transverse to the optical axis and are aligned with the optical axis. As a result, adjustment of the adjustable mounting devices 300 changes the angular position of the optical element relative to the optical axis.

As illustrated in FIG. 2, rigid support structure 117 preferably comprises an L-shaped structure comprising a first arm 301 and a second arm 302 integrally meeting at one of their end portions 304. First arm 301 is preferably longer than the second arm 302. Preferably, first arm 301 is about twice as long as the second arm 302 and the aperture is formed in the center of the first arm 301. The first arm 301 and the second arm 302 enclose an angle 303 therebetween. In the present embodiment, the enclosed angle 303 is 90°, as this will enable the easiest and most accurate adjustments of the optical elements. However, those skilled in the art will appreciate that a wide variety of angles may be used. Those skilled in the art will also appreciate that rigid support structure 117 may take on a variety of other forms. For example, rigid support structure 117 may comprise a T-shaped structure or a solid plate in the form of a triangle with adjustable mounting devices 300 located at each of the corners of the triangle. Similarly, rigid support structure 117 may comprise a square or circular plate.

Although three adjustable mounting devices 300 are used in connection with the illustrated embodiment, those skilled in the art will recognize that in other embodiments of the invention additional adjustable mounting devices 300 may be used.

Using an L-shaped rigid support structure 117 as illustrated in FIG. 2 leads to a very easy, symmetric adjusting operation for the optical element 116. This is in part because the arms of the rigid support 117 essentially form an eccentric lever relative to the optical element and the front end wall 96 of the tube. It is also due in part to the fact that the first arm 301 and the second arm 302 are integrally attached to one another at one of their end portions 304. As a result, arms 301 and 302 share a common adjustable mounting device 300 for mounting the rigid support structure 117 to the laser tube.

When one of the two non-shared adjustable mounting devices 300 is used for adjusting the optical element 116, the optical element 116 is essentially rotated only about the x-axis or the y-axis, assuming that the arms 301, 302 form a coordinate system with its origin in the center of the shared adjustable mounting device 300. In other words, the x-axis is the axis in parallel to the first arm 301 and the y-axis is the axis in parallel to the second arm 302.

Thus, the adjustable mounting units 103, 120 according to the present invention provide a very symmetric and easy way for the reflective optical elements 116, which make up the laser resonator, to be adjusted relative to the optical axis.

The adjustable mounting devices 300 according to the present invention preferably comprise a stud bolt 403, a biasing element 402, such as a coil spring, and an adjusting nut 305. As illustrated in FIG. 4, each stud bolt 403 preferably comprises two threaded ends and a body portion interposed between the two threaded portions. Preferably, as illustrated, the body portion is larger in diameter than the two threaded ends. The first threaded end 404 of stud bolt 403 is slideably received through a hole in the rigid support structure 117 so that the first threaded end extends through the support structure. The second threaded end is used to attach the support structure 117 to the end wall 96 of laser tube 101 (or end wall 98 in the case of adjustable mounting unit 120). Coil spring 402 may be slideably carried on the body portion of stud bolt 403, and adjusting nut 305 is threaded onto the first threaded end 404 of the stud bolt 403 extending through the rigid support structure. As a result, the support structure 117 is slideably interposed between the adjusting nut 605 and a first end of the coil spring. When the threaded end of the stud bolt is attached to the laser tube, spring 402 biases the support structure 117 away from the second threaded end of the stud bolt 403 toward the adjusting nut 305.

Preferably stud bolt 403 further comprises a spring stop 401 disposed on the body portion of the stud bolt proximate to the second threaded end. The second end of coil spring 402 then abuts the spring stop 401 so that the coil spring is interposed between the spring stop and the rigid support structure 117.

Figure 4:
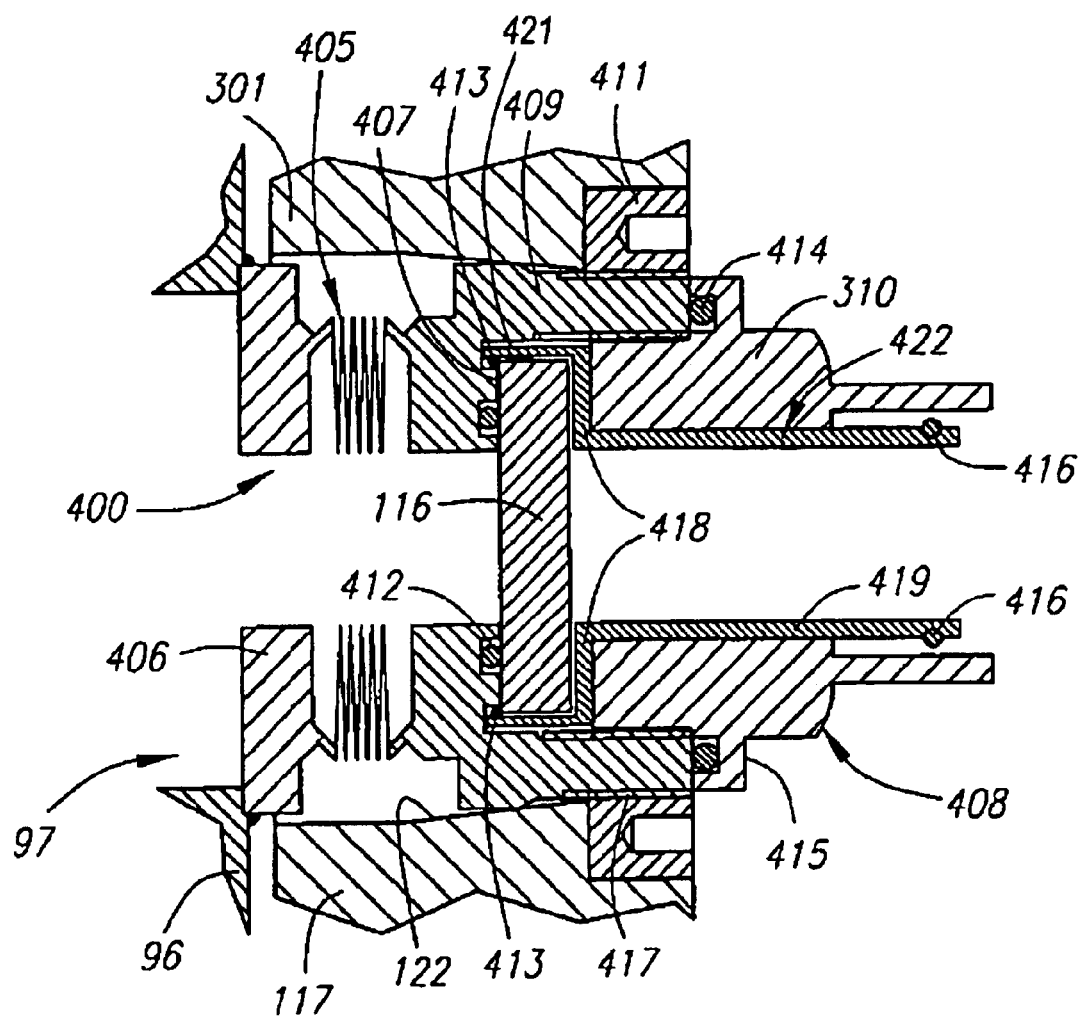
FIG. 4 is an enlarged cross-sectional view of a portion of the adjustable mounting unit shown in FIG. 3 and better illustrates the optical holding and extraction device according to the preferred embodiment of the invention.

Recesses 420 are preferably provided, as shown in FIG. 4, in the rigid support structure 117 for receiving the first end of each of the coil springs 402 of the adjustable mounting devices 300. In the present embodiment, recesses 420 are provided at each end portion 304 of the first arm 301 and the second arm 302. Thus, each recess 420 receives one of the coil springs 402, which are carried on a corresponding stud bolt 403.

Adjusting nuts 305, springs 402, and the stud bolts 403 may be used to mount the rigid support structure 117 on a peripheral edge 306 of the end wall 96 of the laser tube 101 as shown in FIG. 4, or, alternatively on end wall 98.

Preferably the adjustable mounting units 103, 120 according to the present invention further comprise a gas-tight flexible tube element 400 which may be used to form a gas-tight seal between one of the end walls 96, 98 of laser tube 101 and the a reflective optical element 116. Preferably, the flexible tube element comprises a base end 406, an optical element receiving end 409, an optical element receiving surface 407 within the flexible tube element proximate to the receiving end, and a flexible section 405 interposed between the base end 406 and the receiving surface 407. The flexible section 405 may comprise, for example, a bellows.

The base end 406 of the flexible tube is hermetically attached to end wall 96 around the port 97 so that the optical axis of the laser passes through the flexible tube element. If an adjustable mounting unit is also provided at end wall 98, then the base 406 of a second flexible tube element is hermetically attached to the end wall 98. The base end 406 is preferably hermetically attached to the appropriate end wall by welding or brazing. The exterior surface of the optical element receiving end 409 is engaged with the aperture wall 122 in the rigid support 117. Further, the optical element 116 is received by the optical element receiving surface 407 within the flexible tube element and a seal 412, such as an O-ring is provided between the optical element 116 and the optical element receiving surface 407 to help form a hermetic seal between the two.

To ensure that the exterior surface of the optical element receiving end 409 is frictionally locked against aperture wall 122, a locking ring 411 having internal threads 417 may be threadably engaged onto mating threads provided on the exterior surface of the optical element receiving end 409 of the flexible tubular element 400. Locking ring 411 is threaded down onto the receiving end 409 until it abuts rigid support 117. Once locking ring 411 is pressing against rigid support 117, further rotation of the locking ring in the direction of tightening draws the flexible tubular element 400 into the aperture and into contact with the aperture wall 122. By tapering the aperture wall 122 so that it narrows or tapers toward the side facing away from the laser, the frictional engagement of the optical element receiving end and the aperture wall can be further improved.

Adjustable mounting units 103, 120 also preferably comprise an optical element retainer 310. Retainer 310 retains or secures the optical element 116 against the optical element receiving surface 407, as well as seal 412, thus helping maintain a gas-tight seal between the optical element and the optical element receiving surface 407. To ensure that optical element 116 is securely held in place when the laser gas contained within the laser tube is under pressure, retainer 310 is engaged with the optical element receiving end 409 of the flexible tubular element 400. In the present embodiment, retainer 310 comprises an externally threaded sleeve that is threadably engaged with the internal surface of the optical element receiving end 409. As a result, the optical element 116 is interposed between the retainer 310 and optical element receiving surface 407, thereby improving and maintaining the seal formed between the optical element and the receiving surface.

Thus, by employing the flexible tube element 400 as described above, the optical element 116 may be used to seal the laser tube 101, while still allowing the optical element to be angularly adjusted. This in turn permits the laser to be designed without using a fully transparent lens mounted directly on end walls 96, 98 to seal the laser, thereby reducing the number of optical elements through which the laser light must pass.

Preferably the optical element 116 is symmetrically disposed between an even number of the adjustable mounting devices 300. For example, if the even number of fixation points selected is two, then the center of the optical element 116 preferably falls on a line that bisects the line connecting the two fixation points at their midpoint, and more preferably it is positioned close to the center of the line connecting the two fixation points as illustrated in FIG. 2. The remaining fixation points can be used to tilt the support, and thereby adjust the optical element and the laser unit.

A seal 414, such as an O-ring, may also be provided between an annular shoulder 415 of the retainer sleeve 310 and the optical element receiving end 409 of the flexible tubular element. The use of seal 414 is advantageous in situations where the laser beam delivery area 412 between optical element 116 and the work piece must be evacuated or, alternatively, filled with a gas, such as nitrogen, to permit the laser beam to be properly transmitted to the work piece.

According to the present invention, retainer 310 forms part of an optical element holding and extraction device 408. Optical element holding and extraction device 408 is used to help minimize the potential of damaging the optical element 116 during maintenance and installation. The optical element holding and extraction device 408 comprises retainer 310 and an optical element holder 422. Optical element holder 422 comprises a gripping portion 418 that grips the optical element and a tubular extraction portion 419 attached to the gripping portion.

As can be seen from FIGS. 3 and 4, the gripping portion 418 is in a gripping arrangement around the peripheral edge of optical element 116. To achieve this gripping arrangement, the gripping portion 418 preferably comprises an annular clip 421 in which the optical element is received and a stop 413. Stop 413 is provided on the inner diameter of the annular clip 421 and abuts the laser side of optical element 116 to help lock the optical element in the annular clip 421 of the gripping portion 418. Stop 413 may comprise, for example, a snap ring or other locking mechanism such as a detent. Thus, with the aid of stop 413, the optical element 116 is prevented from falling out of the gripping portion 418 when the optical element holding and extraction device 408 is detached from the adjuststable mounting structure 103 or 120. This is true even though O-ring seal 412 tends to stick to the mating face of the optical element 116 and thus tends to pull the optical element toward the laser tube 101.

A further advantage of the optical element holding and extraction device 408 according to the present invention is that the gripping portion 418 includes a shoulder that is interposed between the optical element 116 and retainer sleeve 310. As a result, when retainer sleeve 310 is screwed into optical element receiving end 409 of tubular element 400, the retainer sleeve does not scratch the optical element because it does not come in direct contact with the optical element.

The tubular extraction portion 419 is connected at one end to the gripping portion 418. The axis of the tubular extraction portion extends longitudinally in a direction parallel to the optical axis of the laser. The tubular extraction portion is preferably dimensioned so that the exterior wall of the extraction portion slideably abuts the interior wall of retainer sleeve 310. As a result, the tubular extraction portion is slideably engaged with the inner diameter wall of the retainer sleeve. Furthermore, tubular extraction portion 419 is preferably longer than the corresponding length of the portion of retainer 310 that is slideably engaged with the tubular extraction portion.

A catch 416 is also preferably provided on the exterior surface of tubular extraction portion of the optical element holder 422. Catch 416 may be, for example, a snap ring or a detent. Catch 416 is preferably provided proximate the end of tubular extraction portion 419 that is opposite the end connected to the gripping portion 418.

When retainer 310 is detached from the optical clement receiving end 409, the retainer 310 may be slid along the surface of the tubular extraction portion 419 of the optical element holder 422 until it comes in contact with catch 416. Continued pulling on the retainer 310 in a direction away from the laser causes a transfer of force via the catch 416 to the tubular extraction portion 419, and gripping portion 418 to the optical element 416. As a result, optical element 416 may be readily and safely removed from the optical element receiving surface 407 with significantly reduced risk for potential damage.

Another advantage of the optical element holding and extraction device 408 according to the present invention is that it permits the optical element 116 to be secured to the optical element receiving surface 407 in any desired rotational position. In other words, the optical element 116 may be rotated around a rotational axis extending parallel to the emitted laser beam, and thus the optical axis, by any angle. In addition, with the optical element and extraction device 408 according to the present invention, the rotation may be achieved without first emptying the laser gas.

When the optical element 116 is to be rotated, retainer 310 is loosened. Retainer 316 is loosened, however, only enough to permit optical element holding and extraction device 408 to be rotated while making sure that the optical element 116 remains gas tightly sealed to the receiving surface 407. Once retainer 310 is sufficiently loosened, the optical element holding and extraction device 408 may be rotated by grasping onto the tubular extraction portion 419 and rotating it in the desired direction. A pair of pliers may be used to help rotate device 408 if needed. Thus, although optical element 116 remains gas-tightly sealed to the receiving surface 407, it may be rotated, without being damaged or having to empty and then refill the laser gas in the laser, simply by rotating holder 422. The rotation of a laser optical element 116, therefore, may now be accomplished in a very simple manner.

The ability to rotate the optical element without having to empty the laser gas first is desirable from a laser maintenance standpoint. As mentioned above, the laser light tends to blacken the optical element 116 in its central portion. Thus, by being able to rotate the optical element periodically, a portion of the optical element that is not as blackened may be rotated in front of the point where the laser beam strikes the optical element, thereby restoring some of the laser's efficiency. This of course assumes that the laser beam impinges upon the optical element at a point that is eccentric to the rotational axis of the optical element. However, those skilled in the art will be able to readily design a laser in which the laser beam strikes the optical element slightly off center.

From the foregoing, it should be readily understood that according to the present invention, the retainer is preferably an externally threaded sleeve and the optical element is preferably round. The optical element holder is also preferably formed so that it is rotationally symmetrical. Finally, the optical element holder, the retainer and the optical element preferably share a common central axis of rotation.

Once the optical element is rotated through a desired angle, the retainer 310 is tightened to ensure that a gas-tight seal is maintained between the optical element 116 and receiving surface 407.

Though according to the preferred embodiment, the laser was described as using fluorine gas ($F_2$) as a laser gas and helium, neon and/or argon gas as a buffer gas, the laser gas may be selected from the group consisting of Ar and/or $F_2$, Xe and/or $F_2$, Xe and/or $Br_2$, Hg and/or $Br_2$, Hg and/or $Cl_2$, Xe and/or $Cl_2$, Kr and/or $F_2$.

It should be further understood that the invention is suitable for any gas laser, though in the preferred embodiment, an excimer laser is described as an example.

Those skilled in the art will also appreciate that the optical element holding and extraction device 408 according to the present invention is not limited to use in connection with adjustable mounting units 103 or 120 as described in the preferred embodiments. Indeed, the optical element holding and extraction device of the present invention may be used in connection with optical elements that are mounted in non-adjustable mounting structures. For example, the optical element holding and extraction device 408 may be an employed with optical elements that are mounted directly to an end wall of the laser tube. In this situation, the mounting structure formed by the optical element receiving end 409 and the receiving surface 407 of the flexible tubular element may, for example, be machined directly into the end wall of the laser. Alternatively, the mounting structure provided by the optical element receiving end 409 and receiving surface 407 may be formed by one or more flanges that are mounted to the end wall of the laser tube. The mounting structure formed by the optical element receiving end 409 and receiving surface 407 also may be provided in an optical arrangement that is separate from the laser tube.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention, which is set forth in the following claims.

We claim:

1. A gas laser, comprising:

a tube having a first end wall at one end and a second end wall at the other end, wherein the tube defines a cavity for containing a laser gas therein, and the first end wall includes a port;

an electrode system disposed within the tube for generating a laser beam having an optical axis extending longitudinally through the tube and passing through the port;

a mounting structure mounted on the first end wall of the tube, the mounting structure comprising an optical element receiving surface and an aperture extending through the receiving surface, wherein the aperture is disposed transverse to the optical axis and is aligned with the port and the optical axis so that the optical axis passes through the aperture;

an unitary optical element having a peripheral edge, the peripheral edge being substantially planar with respect to a first direction substantially perpendicular to the peripheral edge;

a unitary optical holder comprising a tubular gripping portion and a tubular extraction portion connected at one end to the tubular gripping portion and having a diameter less than the tubular gripping portion, the tubular gripping portion engaging the peripheral edge of the optical element to retain the optical element within the optical holder; and a retainer having an interior surface engaging an exterior surface of the tubular extraction portion of the optical holder so as to be slideable along the exterior surface of the tubular extraction portion in a second direction substantially perpendicular to the first direction, the retainer being engageable with the mounting structure such that the optical element is positioned against the optical element receiving surface to form a gas tight seal therebetween; wherein the optical element is disposed transverse to the optical axis and the optical axis impinges on the optical element.

2. A device according to claim 1, wherein the interior surface of the retainer engages the exterior surface of the tubular extraction portion such that the optical holder and optical element are rotateable with respect to the retainer perpendicular to the second direction.

3. A gas laser according to claim 2, wherein the retainer may be partially disengaged from the mounting structure such that the optical holder and optical element may be rotated within the retainer.

4. A gas laser according to claim 3, wherein the holder may be rotated without breaking the seal between the optical element and the optical element receiving surface.

5. A gas laser according to claim 3, the retainer comprises an externally threaded sleeve;

the optical element is substantially round; and the externally threaded sleeve has an axis of rotation substantially identical to the axis of rotation of the holder and the optical element with respect to the retainer.

6. A gas laser according to claim 1, further comprising an O-ring interposed between the optical element and the optical element receiving surface.

7. A gas laser according to claim 1, wherein the retainer includes a first set of threads;

the mounting structure includes a second set of threads engaging the first set of threads to removeably engage the retainer and the mounting structure.

8. A gas laser according to claim 7, wherein the first set of threads comprises an externally threaded sleeve.

9. A gas laser according to claim 1, wherein the tubular gripping portion comprises a shoulder that is interposed between the retainer and the optical element.

10. A gas laser according to claim 1, wherein the optical element is selected from the group consisting of a fully reflective mirror, a partially transparent, partially reflective mirror, and a fully transparent window.

11. A gas laser according to claim 1, further comprising a catch disposed on the exterior surface of the tubular extraction portion at an end opposite to the end connected to the gripping portion.

12. A gas laser according to claim 11, wherein the catch is selected from the group consisting of a snap ring and a detent.

13. A gas laser according to claim 1, wherein the gripping portion comprises an annular clip in which the optical element is received and a stop provided on the inner surface of the annular clip, said stop holding the optical element in the annular clip.

14. A gas laser according to claim 13, wherein the stop is selected from the group consisting of a snap ring and a detent.

15. A gas laser according to claim 1, wherein the mounting structure comprises a flexible tube element comprising a base end an optical element receiving end, and a flexible section interposed between the base end and the receiving surface, and wherein the optical element receiving surface is part of the flexible tube element, proximate the optical element receiving end.

16. A gas laser according to claim 15, wherein the flexible section comprises a bellows.

17. A gas laser according to claim 15, wherein the base end is hermetically sealed to the first end wall around the port so that the optical axis of the laser passes through the flexible tube element.

18. A gas laser according to claim 3, wherein the optical axis passes through the optical element at a point that is eccentric to the rotational axis of the optical element.

19. A gas laser according to claim 4, wherein the optical axis passes through the optical element at a point that is eccentric to the rotational axis of the optical element.

* * * * *